July 16, 1968    C. A. KREITNER    3,392,805
ADJUSTABLE BRAKE ACTUATING MECHANISM
Filed Oct. 27, 1966    3 Sheets-Sheet 1
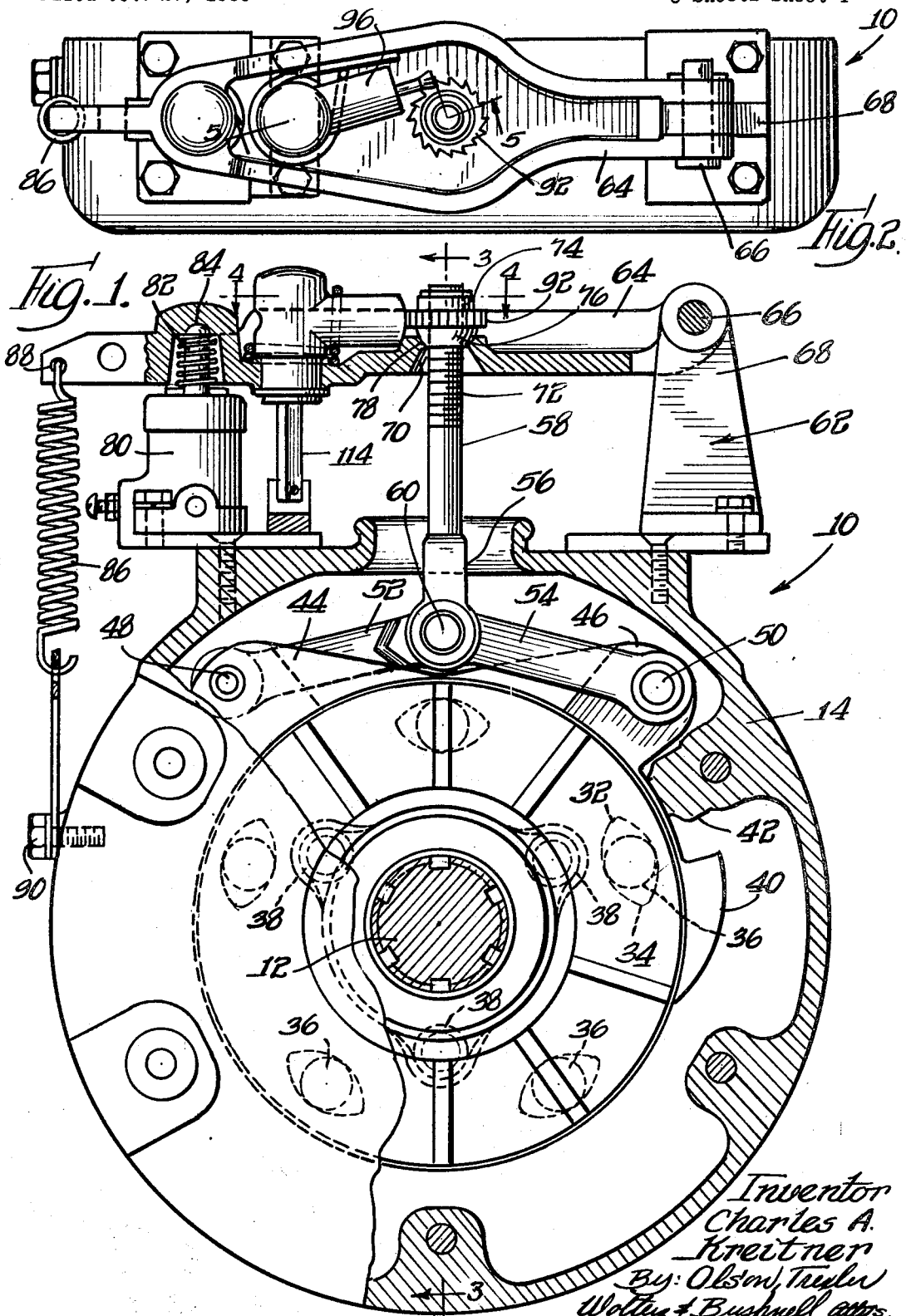
Inventor
Charles A. Kreitner
By: Olson, Trexler, Wolters & Bushnell attys.

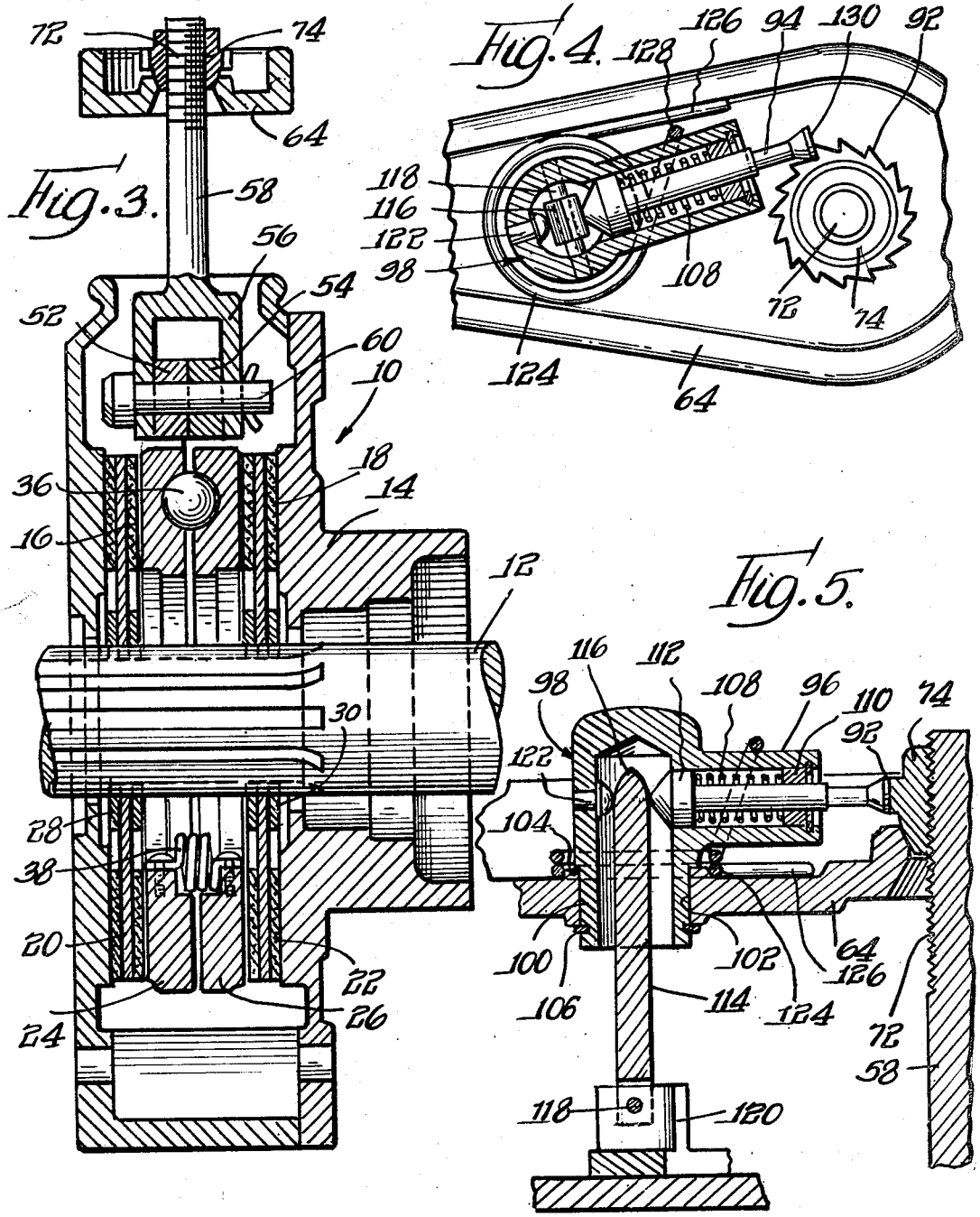

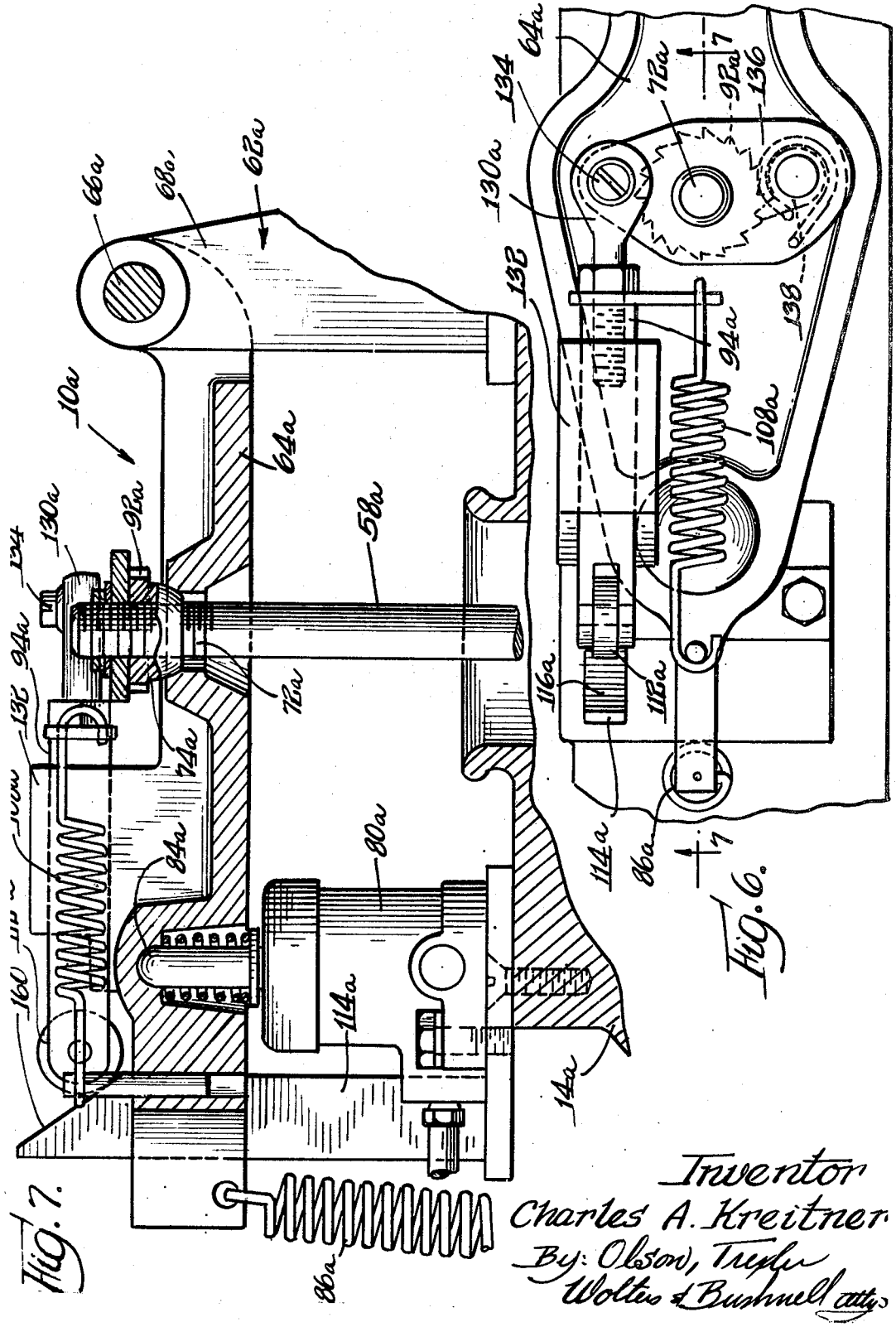

United States Patent Office 3,392,805
Patented July 16, 1968

3,392,805
ADJUSTABLE BRAKE ACTUATING MECHANISM
Charles A. Kreitner, Benton Harbor, Mich., assignor, by mesne assignments, to Lambert Brake Corporation, St. Joseph, Mich., a corporation of Michigan
Filed Oct. 27, 1966, Ser. No. 589,995
5 Claims. (Cl. 188—72)

ABSTRACT OF THE DISCLOSURE

There is disclosed an adjustable brake actuating mechanism for a disc brake, which mechanism includes a rod connected with a lever through an adjustable nut member having ratchet teeth on its periphery. Pawl means including a spring biased plunger is carried by the lever and is actuated by a fixed cam for turning the nut in response to a predetermined movement of the lever during a braking operation.

---

The present invention relates to a novel brake structure, and more specifically to a novel actuating mechanism for a brake structure.

While it will be apparent that various features of the present invention may be adapted for use in different types of brake structures, the invention is particularly suitable for use in connection with disc type brake units.

An important object of the present invention is to provide a brake structure having novel means for automatically compensating or adjusting for wear of the friction surfaces.

More specifically, it is an important object of the present invention to provide novel actuating means for a brake unit having an actuating element or member capable of being automatically adjusted in order to compensate for wear of the friction surfaces.

Still another object of the present invention is to provide a novel disc type brake unit including fluid pressure operated actuating means constructed for automatically compensating for wear of the friction surfaces.

A further object of the present invention is to provide novel actuating means of the above-described type which may be incorporated into brake units of existing constructions.

Other objects and advantages of the present invention will become apparent from the following description and the accompanying drawings wherein:

FIG. 1 is a side elevational view, partially broken away, showing a brake unit incorporating features of the present invention;

FIG. 2 is a plan view of the brake unit shown in FIG. 1;

FIG. 3 is a partial sectional view taken along line 3—3 in FIG. 1;

FIG. 4 is an enlarged fragmentary partial sectional view taken generally along line 4—4 in FIG. 1;

FIG. 5 is an enlarged fragmentary partial sectional view taken generally along line 5—5 in FIG. 2;

FIG. 6 is a fragmentary plan view similar to FIG. 2 but showing a modified form of the present invention; and FIG. 7 is a fragmentary partial sectional view taken generally along line 7—7 in FIG. 6.

Referring now more specifically to the drawings wherein like parts are designated by the same numerals throughout the various figures, a brake unit 10 incorporating features of the present invention is shown in FIGS. 1, 2 and 3. brake unit is adapted to be mounted on a tractor or other vehicle or piece of machinery of known construction for controlling the operation of a rotatable shaft 12. In general the brake unit 10 comprises a housing 14 which is fixed to the frame of the vehicle or apparatus with which is fixed to the frame of the vehicle or apparatus with which the unit is assembled. In the embodiment shown, the housing presents oppositely facing friction surfaces 16 and 18 around the shaft 12. Between the friction surfaces are rotor friction discs 20 and 22 and a pair of opposed stator or actuating discs 24 and 26. The rotor discs have splined internal margins 28 and 30 cooperable with complementary splined portions of the shaft 12 whereby the rotor discs are connected for rotation with but are axially slidable relative to the shaft.

As indicated in FIGS. 1 and 3, the actuating discs 24 and 26 are respectively formed with an annular series of opposed and oppositely extending inclined ball seats or cam surfaces 32 and 34. Ball elements 36 are disposed between these pairs of surfaces. Spring elements 38 are connected between the actuating discs for normally urging the discs to the retracted position shown in FIG. 3 so that the ball elements are located at the lower ends of the cam surfaces or seats. The brake unit is energized by relatively rotating the actuating discs 24 and 26 in the manner described below so as to cause the ball elements to ride up on higher portions of the seat. This action forces the actuating discs 24 and 26 axially away from each other and into frictional engagement with the discs 20 and 22 which are in turn urged into frictional engagement with the surfaces 16 and 18 on the fixed housing. Rotation of the actuating discs relative to the housing is limited by lugs 40, only one of which is shown, on the discs which lugs are engageable with abutments 42 on the housing. The lugs and abutments are formed and located in a known manner so that the lug on one of the actuating discs limits rotation in one direction while the lug on the other of the actuating discs limits rotation in the opposite direction whereby the brake unit may be effective for controlling rotation of the shaft 12 in opposite directions.

Ears 44 and 46 are formed integrally with and project radially from the actuating discs 24 and 26 at circumferentially spaced locations as shown best in FIG. 1. These ears are respectively connected by pins 48 and 50 to links 52 and 54 which extend toward each other adjacent the periphery of the discs. Overlapping ends of the links 52 and 54 are embraced by a yoke portion 56 of an actuating link or pull rod 58. A pivot pin 60 serves to connect the yoke portion with ends of the links 52 and 54. With this arrangement, a radially outwardly pull of the link member or rod 58 pulls the inner ends of the links 52 and 54 outwardly, which links serve to rotate the actuating discs relative to each for energizing the brake unit.

In accordance with a feature of the present invention the brake unit 10 includes an actuating mechanism 62 shown in FIGS. 1–5. The aforementioned actuating link or pull rod 58 and the associated elements are part of the actuating mechanism. In addition this mechanism includes a lever 64 having one end pivotally connected by pin 66 to an upstanding bracket 68 mounted on the housing 14. An aperture 70 is formed in an intermediate portion of the lever 64, through which aperture a threaded end portion 72 of the actuating link member or pull rod 58 projects.

An internally threaded nut member 74 is turned on to the exposed end of the threaded portion 72 above the lever 64. The nut member has a ball or spherical portion 76 cooperable with a complementary seat 78 surrounding the aperture 70 for accommodating the relative angular displacement between the lever 64 and the pull rod 58 when the mechanism is actuated in the manner described below.

In order to operate the lever arm 64 and energize the brake structure, a hydraulic or fluid operated cylinder 80 is mounted on the housing 14 adjacent an end of the lever opposite from the pivot 66. A fluid or hydraulically operated piston is disposed within the cylinder 80 in a known manner and carries a piston rod 82 which projects from the cylinder and engages a seat 84 formed in the underside of the lever 64. Preferably the engaging surfaces at the end of the piston rod 82 and the seat 84 are rounded for accommodating relative angular displacement between the lever and the piston rod. With the arrangement shown in the drawings, operation of the cylinder 80 so as to extend the piston rod causes the lever 64 to be raised or pivoted in a clockwise direction. This movement pulls the rod 58 generally radially outwardly, which rod in turn actuates the links 52 and 54 for energizing the brake unit as mentioned above.

When the hydraulic or fluid pressure in the cylinder 80 is relieved, the previously mentioned springs 38 bias the actuating discs toward their retracted or deenergized position. In addition a spring 86 is connected between an end 88 of the lever 64 and an anchor 90 of the housing 14 as shown in FIGS. 1 and 2 for biasing the lever 64 and the piston rod 82 toward their retracted positions. Stop means is provided which, in the embodiment shown, comprises the piston rod 82 for positively limiting the downward movement of the lever 64. This stop means thereby positively limits downward movement of the pull rod 58 which in turn positively locates the retracted or deenergized position of the actuating discs 24 and 26. It will be appreciated, that by adjusting the retracted or deenergized position of the actuating discs, the running clearances between the friction surfaces of all of the discs and the housing can be adjusted for minimizing the amount of relative movement which must take place between the actuating discs before the brake becomes energized. The actuating mechanism 62 is provided with means for accomplishing such adjustment automatically in response to any wear of the friction surfaces.

As previously indicated, the downward movement or retracted position of the lever 64 is positively controlled by suitable stop means such as the piston rod 82. In order to accomplish the aforementioned adjustment of the retracted or deenergized position of the discs 24 and 26, the actuating mechanism is provided with means for adjusting the effective length of the actuating link or pull rod 58. This means includes the aforementioned nut member 74 which is assembled on the threaded end portion 72 of the pull rod. The nut member has ratchet teeth 92 formed around the periphery thereof engageable with a spring biased plunger or pawl 94 as shown in FIGS. 2, 4 and 5. The pawl or plunger 94 is slidably disposed within and projects from a sleeve portion 96 of a hollow fitting 98 having an upstanding tubular portion 100 which is rotatably or pivotally mounted in an aperture or socket 102 in the lever arm 64. As shown in FIG. 5, a shoulder 104 on the tubular portion 100 limits downward movement of the fitting while a snap ring 106 projects from a groove in a lower end portion of the tubular section for engaging the underside of the lever arm 64 and releasably securing the fitting in assembled relationship with the lever arm.

A compression spring 108 is disposed within the sleeve portion 96 between a fixed abutment 110 and an enlarged head 112 at an end of the plunger 94. This spring serves to urge the head 112 against an upstanding cam element 114 having a beveled upper end portion 116. A lower end portion of the cam element is pivotally connected by pin 118 to a bracket 120 secured with respect to the brake unit housing. A pad 122 is fixed within the fitting 98 in opposing relationship to the enlarged head 112 for engagement with the cam element and maintaining the cam element substantially centrally located within the fitting 98.

A spring 124 encircles the tubular portion 100 of the fitting 98 and has one end 126 anchored against the lever arm 64 and an opposite end 128 biased against the sleeve portion 96 of the fitting. The construction and the arrangement of the spring 124 is such as to bias the fitting 98 in a clockwise direction as viewed in FIG. 4 so as yieldably to urge the plunger or pawl 94 against the ratchet teeth 92.

During operation of the brake structure, the hydraulic cylinder is actuated for pivoting or raising the lever arm 64 in the manner previously described. When this occurs, the head portion or cam follower 112 on the plunger or pawl 94 rides up from the straight side of the cam element 114 and moves upwardly along the tapered cam surface 116. This action permits the spring 108 to force the plunger or pawl 94 toward the left as viewed in FIGS. 4 and 5. As the pawl or plunger moves toward the left, the ratchet tooth engaging end 130 thereof slides along an inclined back surface of one of the ratchet teeth. The upward movement of the lever arm 64 and thus the upward movement relative to the inclined cam surface 116 is limited by the interengagement of the friction surfaces of the discs and the housing.

As the surfaces wear way after repeated operation of the brake, the upward movement of the lever arm 64 increases until finally the pawl or plunger 94 rides up on the cam sufficiently to permit the end portion 130 to slide completely over the inclined back surface of a pawl tooth and to snap over such tooth for engagement with the generally radially extending abutment surface of the tooth. Then when the lever arm 64 is lowered during deenergization of the brake, the cam element 114 forces the pawl 94 toward the right as viewed in FIGS. 4 and 5 and the pawl in turn drives the engaged ratchet tooth and rotates the nut element 74 on the threaded portion 72 of the pull rod 58. This action causes the nut member to move axially downwardly on the pull rod as viewed in FIGS. 1 and 5. As a result, the effective length of the pull rod 58 is shortened and this in turn adjusts the retracted or deenergized position of the actuating discs. Adjustment of the effective length of the pull rod 58 is repeatedly and automatically made during the life of the brake unit in accordance with the wear of the friction surfaces for maintaining generally uniform running clearances and uniform operating characteristics.

FIGS. 6 and 7 show a brake untit 10a which is similar to the unit described above as indicated by the application of identical reference numerals with the suffix a added to corresponding elements. While only the actuating mechanism 62a of this embodiment is shown, it is understood that the brake unit may include housing and disc members as described above or of other known constructions.

This embodiment differs primarily in the particular construction of the ratchet actuating pawl or plunger means. More specifically, the plunger 94a is slidably disposed in a guide 132 fixed on the lever arm 64a rather than in the previously described pivotally mounted fitting. An end portion 130a of the plunger 94a is pivotally connected by pin 134 with plate member 136 which in turn is pivotally supported for movement about the axis of the pull rod 58a. The plate member 136 carries a spring biased pawl 138 which is engageable with the ratchet teeth 92a for adjusting nut member 74a in accordance with the wear of the friction surfaces in the brake unit.

While the preferred embodiments of the present invention have been shown and described herein, it is obvious that many structural details may be changed without departing from the spirit and scope of the appended claims.

The invention is claimed as follows:

1. In a brake unit having friction surfaces, the combination comprising a first actuating member disposed for axial movement, a second actuating member mounted for pivotal movement, means adjustably connecting said second member at a predetermined position to said first member, said means including helical thread means on said first member, a nut element abutting said second actuating member and complementary to and engaging said thread means and being axially shiftable along said first member upon rotation relative thereto, and means for automatically adjusting the position of said nut element along said first member in accordance with and for compensating for wear of said fraction surfaces, said last named means comprising ratchet teeth on said nut element, pawl means engaging said ratchet teeth and movable with said second actuating member, spring means biasing said pawl means away from engagement with said ratchet teeth, said pawl means including a plunger, and fixed cam means adjacent said second actuating member and engageable with said plunger for permitting movement of the plunger away from the ratchet teeth when said second member is pivoted for energizing the brake and for positively urging said plunger against said ratchet teeth when said second member is pivoted for releasing the brake.

2. A combination, as defined in claim 1, which includes a fitting pivotally mounted on said second actuating member and carrying said plunger.

3. A combination, as defined in claim 1, wherein said plunger is reciprocably mounted on said second actuating member, said pawl means further comprising a plate member mounted for pivotal movement about said first actuating member and connected with said plunger, and a pawl element carried by said plate member.

4. A combination, as defined in claim 1, which includes fluid pressure operable cylinder and piston means connected with said second actuating member for operating said second actuating member.

5. A combination, as defined in claim 1, wherein said brake unit comprises housing means adapted to be disposed concentrically with respect to a rotatable member to be controlled, said housing means including annular friction surface means, friction disc means within said housing means connectable with said rotatable member and engageable against said friction surface means, first and second opposed relatively rotatable first and second actuating discs engageable with said friction disc means, means between said actuating discs for relatively axially shifting the actuating discs and energizing the brake unit upon relative rotation of the actuating disc, first and second link members respectively having ends connected with said first and second actuating discs at circumferentially spaced apart locations, and means connecting opposite end portions of said link members with said first actuating member.

References Cited

FOREIGN PATENTS 156,181    4/1954    Australia.

FERGUS S. MIDDLETON, *Primary Examiner.*

GEORGE HALVOSA, *Examiner.*